United States Patent [19]

Ginnasi et al.

[11] 3,860,496

[45] Jan. 14, 1975

[54] PROCESS FOR THE RECOVERY OF ISOPRENE FROM MIXTURES CONTAINING THE SAME

[75] Inventors: Alessandro Ginnasi; Carlo Rescalli, both of San Donato Milanese, Italy

[73] Assignee: Snam Progetti, S.p.A., San Donato Milanese, Italy

[22] Filed: Dec. 29, 1971

[21] Appl. No.: 213,544

[30] Foreign Application Priority Data

Dec. 29, 1970 Italy .............................. 33613-A/70

[52] U.S. Cl........................ 203/28, 203/58, 203/59, 260/681.5 R, 203/84, 203/71
[51] Int. Cl.............................................. B01d 3/34
[58] Field of Search ............ 203/28, 58, 60, 53, 54, 203/51, 59, 71, 81, 63, 62; 260/681.5, 680; 208/326

[56] References Cited
UNITED STATES PATENTS

| | | | |
|---|---|---|---|
| 2,426,705 | 9/1947 | Patterson et al...................... | 203/59 |
| 2,461,346 | 2/1949 | Patterson ..................... | 260/681.5 R |
| 3,012,947 | 12/1961 | Kelley et al.................. | 260/681.5 R |
| 3,038,016 | 6/1962 | Hachmuth.................... | 260/681.5 R |
| 3,230,157 | 1/1966 | Hill et al....................... | 260/681.5 R |
| 3,436,438 | 4/1969 | Takao et al.................. | 260/681.5 R |
| 3,510,405 | 5/1970 | Susumu Takao et al............ | 203/60 |
| 3,634,537 | 1/1972 | Hutto............................ | 260/681.5 R |
| 3,707,575 | 12/1972 | Muller et al........................ | 203/60 |

*Primary Examiner*—Wilbur L. Bascomb, Jr.
*Assistant Examiner*—Frank Sever

[57] ABSTRACT

A multi-stage method is disclosed whereby isoprene of high purity is recovered from mixtures of $C_5$ hydrocarbons containing it, wherein the mixture is subjected to a first extractive distillation stage in the presence of a solvent, such as morpholine and N-formyl-morpholine, containing water and in which olefinic and saturated hydrocarbons are withdrawn as a top product; a second extractive distillation stage effects the withdrawal of the major part of the cyclopentadiene and acetylene compounds present in the bottom product of the first stage as a sidestream and said solvent constitutes a bottom product for recycling to said first and second stage; in a third extractive distillation stage the top product of the second stage is treated with solvent containing water, fed to the third stage from a stripper and then recycled as bottom product to said stripper; and, in a rectification stage, isoprene of desired purity is recovered from the overhead product of the third extractive distillation stage.

4 Claims, 1 Drawing Figure

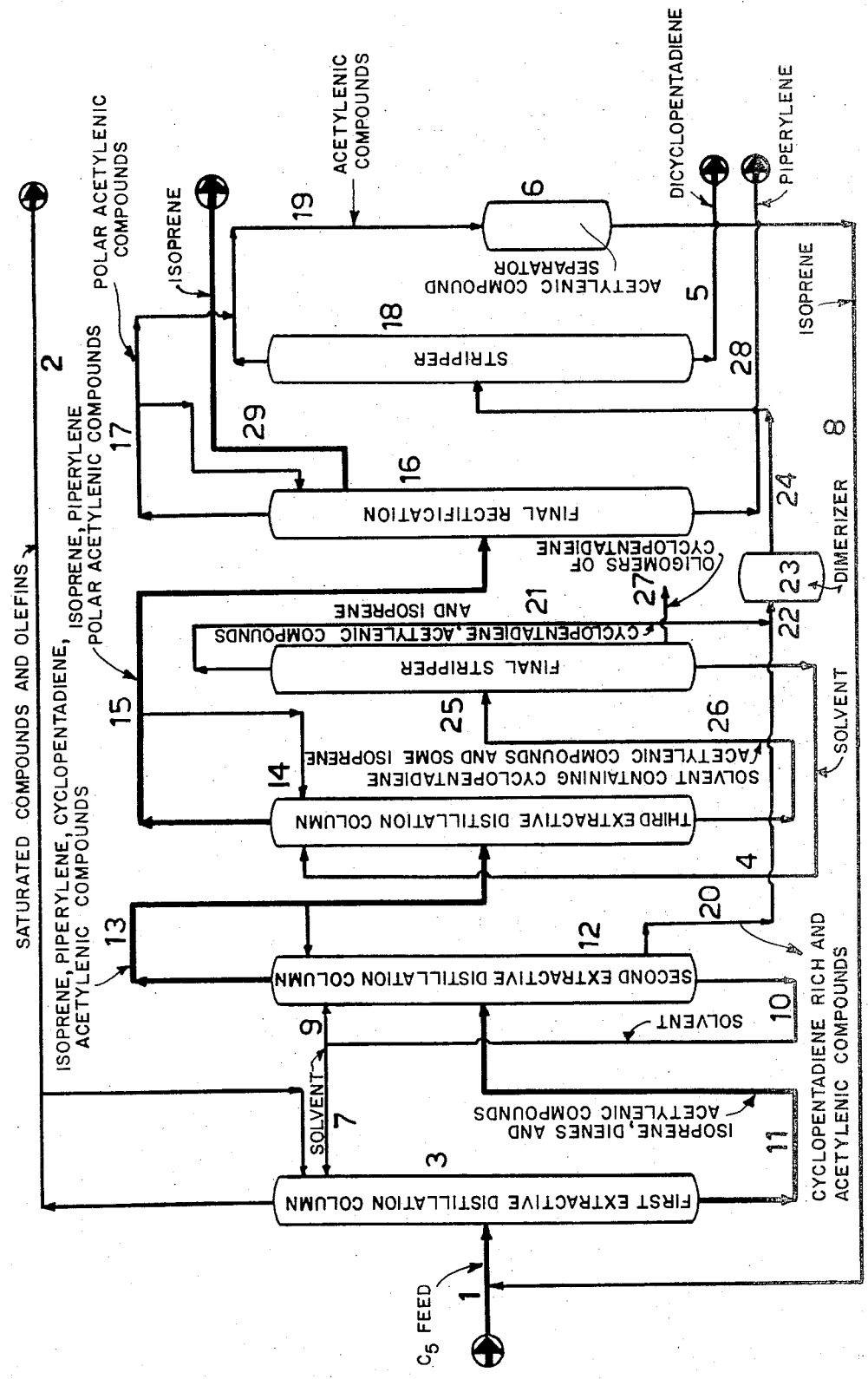

PROCESS FOR THE RECOVERY OF ISOPRENE FROM MIXTURES CONTAINING THE SAME

The present invention relates to a process for the recovery of isoprene from mixtures containing the same. More particularly the present invention relates to the extraction of high purity isoprene from mixtures containing the same.

It is known that isoprene must be obtained with a high degree of purity when it is used for producing stereospecific polymers since the impurities would be extremely detrimental, at concentrations higher than a certain value, during the same polymerization; we refer particularly to cyclopentadiene. Isoprene must have in fact a cyclopentadiene content lower than few p.p.m.; said impurity is always present in the $C_5$ stream coming, for instance, from the pyrolisis processes which are an important isoprene source; in said $C_5$ streams isoprene can be contained at percentages ranging from 10 to 30% according to the working conditions of the pyrolisis.

Many processes are known for the extraction of isoprene from mixtures containing the same. A typical process for removing cyclopentadiene is based on the fact that cyclopentadiene, after heating to a temperature higher than about 80°C, is dimerized to dicyclopentadiene which is removable by distillation. In practice the starting material is treated at high temperature and pressure for effecting the dimerization. Even though this treatment allows removal of the cyclopentadiene, nevertheless it causes a remarkable and undesired loss of isoprene, since isoprene also shows a certain reactivity. Moreover said treatment requires rather long reaction times. Another process for removal of cyclopentadiene is the extractive distillation.

When the starting material containing isoprene and cyclopentadiene is subjected to extractive distillation in the presence of a suitable solvent, containing or not containing water, for obtaining isoprene as distillate, the cyclopentadiene is extracted with the solvent since the specific volatility of cyclopentadiene is lower than that of isoprene.

We have found, and this is the subject of the present invention, a process for the recovery of isoprene from mixtures of $C_5$ hydrocarbons, which process allows a remarkable working elasticity and above all the easy recovery of isoprene at the desired purity required in the polymerization, i.e. with contents of cyclopentadiene lower than a few p.p.m., preferably lower than 1 p.p.m. Moreover, the process according to the present invention and the advantages resulting from the use of said process, are limited neither by the type of treated feed, nor by the solvent used for recovering the isoprene from the same feed. It is however a characteristic of the process according to the present invention that solvents containing various percentages of water that is, from 1–25%, are used. As regards the usable solvents, for instance N-formyl-morpholine and morpholine with 1–20% of water, they allow one to obtain polymerization grade isoprene having cyclopentadiene contents lower than few p.p.m. and acetylenic compounds contents generally lower than 50 p.p.m., even when we start from $C_5$ fractions containing cyclopentadiene in a ratio 1/1 by weight with isoprene and particularly rich in acetylenic compounds (up to 5% by weight in the feed to the extraction cycle). Morpholine mixed with water, preferably in amounts of 5% by weight, or mixtures of morpholine and formylmorpholine mixed with water can be usefully used, owing to the excellent selectivity shown in the separation of isoprene from $C_5$ olefines, cyclopentadiene and acetylenic compounds, as it is known also from Italian patent application of the same applicant No. 19.814 A/69 filed on July 18, 1969.

As already stated, the use of other solvents, already known in the art and commonly used in extraction processes, as acetonitrile, furfural, aniline, dimethyl formamide, dimethyl acetamide, N-methyl pyrrolidone, β-methoxypropionitrile, allows one to obtain very good results, when said solvents are used in the process according to the present invention.

The high purity isoprene is obtained, after all, through a purification cycle which makes use of columns provided with a suitable number of plates. The cycle in question offers also that working elasticity which is necessary in a process wherein the composition of the feed may vary in sensible way, for instance according to the operative conditions of the steam cracking wherein said feeds are produced.

The process which is the subject of the present invention consists essentially in introducing a feed, constituted mainly by $C_5$ hydrocarbons and containing the isoprene to be recovered, into an extractive distillation column whereto is fed also a suitable solvent containing water, which solvent in the following description we will call generically solvent; the overhead product of said column is removed from the cycle. The bottom product is fed to a second extractive distillation column to which other solvent is fed.

The top product of said second extractive distillation column is fed to a third extractive distillation column to which the solvent coming from a stripper is also fed; the overhead product of said third extractive distillation column containing almost all the isoprene is forwarded to conventional rectification operations for recovering the isoprene at the desired purity; the bottom product is subjected to a stripping operation for recovering the solvent which is then fed, as said, to the third extractive distillation column.

From the top of the solvent stripper, a stream is withdrawn which either is recycled to the second extractive distillation column, or discharged, or united to the side stream of the second extractive distillation column; said stream can be forwarded either to the step of separation of cyclopentadiene and of recovery of the isoprene contained therein or, according to the needs, discharged.

Said stream, before being forwarded to the separation, when this is provided, is subjected to dimerization of cyclopentadiene and of other substances capable of reacting according to the Diels-Alder reaction; the so obtained isoprene stream, before being recycled to the first extractive distillation column, is freed from acetylenic compounds according to conventional techniques. In the stripping step for the regeneration of the solvent there is provided a discharge of dimers of cyclopentadiene and of other dienes from the vapour phase of the reboiler or from a point of the column comprised between the reboiler and the feed. Said operation is possible owing to the presence of water in the solvent, which water, as already said, represents one of the characteristics of the process according to the present invention.

Therefore the process according to the present invention comprises essentially the following steps:

feeding the feed to an extractive distillation column in the presence of a suitable solvent containing water;

feeding the bottom product of the first column to a second extractive distillation column still in the presence of solvent containing water;

feeding the overhead product of the second extractive distillation column to a third extractive distillation column to which other solvent containing water is fed;

discharging from the top of said third extractive distillation column a stream containing isoprene which is sent to conventional rectification operations;

discharging from the bottom of the third extractive distillation column a stream which is then fed to a stripping step for the solvent recovery;

discharging oligomers and dimers formed in the bottom portion of the stripper;

discharging from a side drawing of the second extractive distillation column and from the top of the stripping step streams containing essentially isoprene and cyclopentadiene; the first stream is either discharged or alternatively subjected to dimerization, separation of the acetylenic compounds according to conventional techniques and recovery of isoprene by recycle of the same to the first extractive distillation column; the second stream is either recycled to the second extractive distillation column or discharged or alternatively subjected to dimerization and recovery of isoprene after separation of the acetylenic compounds according to conventional techniques.

The following detailed description, given as unrestrictive example of a possible embodiment of the process according to the present invention is directed to make more clear the process. It is to be noted contemporaneously that the process object of the present invention can be also partially utilized. In the specification we will make reference to the more general case in which there are the steps of dimerization and recovery of isoprene from said stream.

With reference to the FIG. 1 the feed, essentially constituted by $C_5$ hydrocarbons coming, for instance, from pyrolisis processes and containing the isoprene to be recovered, is introduced through 1 into a first extractive distillation column 3 whereto also solvent is fed, through 7. Saturated compounds and olefines, less soluble in the solvent, are discharged from the top of column 3, through 2, while isoprene, the other dienes and the acetylenic compounds more soluble in the solvent are discharged from the bottom, through line 11.

Another prerogative of said invention is that the cyclopentadiene fed to the column 3 can be contained in the initial feed also at rather high ratios with respect to the isoprene (about 1/1), without its partial preliminary removal, in order to have at the bottom of column 3 a high dienes concentration, which allows one to maintain the reboiler temperature at relatively low values for limiting the well known polymerization phenomena of the dienes at high temperatures. In this way the recycle of isoprene to the bottom of the column, usually effected for attaining this end, is avoided.

The stream discharged from the bottom of column 3 is fed, through line 11, to a second extractive distillation column 12 wherein the separation of the major part of cyclopentadiene and acetylenic hydrocarbons from isoprene is effected; said column, according to the invention, works so as to lower to very low values the cyclopentadiene content in the stream leaving the column top, preferably to values in the range of same units per cent, and to discharge a side stream, line 20, cyclopentadiene rich and containing most of the acetylenic compounds of the feed; from the bottom, through line 10, the solvent to be recycled both to the top of column 3 and to the top of the same column 12, through 9, is discharged.

The side stream, line 20, may contain also appreciable isoprene amounts; therefore said stream can be subjected to the thermal dimerization of cyclopentadiene in 23 and, after stripping in 18 and removal of the acetylenic compounds by conventional techniques in 6, isoprene can be recovered and recycled to a suitable point of the cycle, through 8. As aforesaid, said stream may be also discharged.

The present invention presents therefore the advantage of obtaining, through column 12, a constant composition of the feed with respect to the possible variations of the composition of the feed introduced, through 13, into the last extractive distillation column 14 which has the purpose of producing isoprene with the desired concentration of cyclopentadiene and polar acetylenic compounds; said column 14 is critical and it is preferred that it works with isoprene streams containing cyclopentadiene in rather low amounts, preferably of about 1%.

The aforesaid advantage consists in that this is possible also when the cyclopentadiene amount in the initial feed varies in a rather sensible way, owing to the elasticity of column 12, which is not strictly bound, being possible to vary the ratio cyclopentadiene isoprene in the side stream of the column; on the other hand it is not even strictly necessary to effect a thorough stripping of the solvent in the bottom of said column, since possible little amounts of cyclopentadiene in the solvent discharged through line 10, do not cause dangerous cyclopentadiene contaminations, since the solvent leaving the bottom of column 12 is of interest only for columns 3 and 12 and not for column 14 (final extractive distillation column) wherein said contamination would be extremely dangerous.

Said working way allows therefore also the possible use either of different solvents or of the same solvent, containing different water amounts respectively in columns 3, 12 and 14.

Another advantage of the present invention is the possible dimerization of cyclopentadiene effected in this point of the cycle; in fact according to said scheme the treatment is effected on streams having a high cyclopentadiene concentration, so lowering the reaction volumes, the permanence times and the isoprene losses.

As regards the acetylenic compounds they are separated according to conventional techniques; it is convenient to effect the separation in the isoprene rich stream obtained from the top of stripper 18 which has the purpose of removing from the cycle, from the bottom of 18 through 5, dicyclopentadiene and the other products formed according to the Diels-Alder reaction.

The overhead stream of column 12, through 13, is fed to the last extractive distillation column 14. The stream is constituted essentially by isoprene, piperylene, some percent of cyclopentadiene and the remaining acetylenic compounds. Isoprene is discharged from the top of column 14, line 15, together with piperylene with the desired amounts of cyclopentadiene and polar acetylenic compounds, while, through 26, the bottom stream constituted by solvent containing cyclopentadiene and acetylenic compounds together with a certain amount of isoprene is fed to the final stripper 25. The cyclopentadiene, acetylenic compounds and isoprene leaving the top of column 25 can be either recycled to a suitable point or fed to the dimerization apparatus 23 through 21 and 22 and to the subsequent isoprene recovery system through 24, or removed from the cycle, when convenient, or also, and preferably, recycled to the column 12. The solvent leaving the bottom of column 25 is recycled to the top of column 14, through 4; in said solvent cyclopentadiene must be absolutely absent.

According to the present invention a remarkable advantage is obtained by effecting, from the vapour phase of the reboiler or from a point on the bottom portion of stripper 25, a discharge of oligomers and dimers of cyclopentadiene and of other dienes, through 27. Said operation is facilitated by the presence of water in the solvent.

The removal of the cyclopentadiene dimers from the solvent, which leaves the bottom of column 25 and is recycled to the top of column 14, eliminates the contamination risks due to the transformation of dicyclopentadiene to cyclopentadiene, which transformation can occur in some point of the upper portion of column 14; the removal of the oligomers lowers the column scaling.

The overhead stream of column 14, with the desired amount of cyclopentadiene and more polar acetylenic compounds, through line 15, is fed to the final rectification, column 16, from the top of which the light residues are discharged, through 17, while piperylene and other heavy hydrocarbons are discharged from the bottom, through 28, and isoprene of polymerization grade is withdrawn through a sidestream 29 from the upper portion of the column.

The overhead product of column 16, through 17, is mixed with the overhead product of column 18, through pipe 19 enters the step 6 for the separation of the acetylenic compounds and then is recycled to the column 3 through 8. Obviously this occurs when there are provided the dimerization of the streams 20 and 21, or at least of one of them, and the subsequent operations for the recovery of isoprene; otherwise stream 17 is discharged.

As regards the solvent, it is useful that an aliquot of the same be continuously withdrawn from the two separate solvent cycles and, after a regeneration treatment, introduced again into the cycle. It is also necessary that the solvent contain some amounts of substances capable of inhibiting polymerization.

Two numerical examples of the process according to the present invention will now be given with reference to the enclosed drawing, for illustrative and unrestrictive purposes.

EXAMPLE 1

We fed to the column 3 a stream of 100 mesh/h of $C_5$ hydrocarbons having the following composition:

| | | | |
|---|---|---|---|
| saturated and olefinic $C_4$ hydrocarbons | = | 0.2% | by moles |
| isopentane | = | 8.6% | do. |
| n-pentane | = | 11.8% | do. |
| 3 methyl 1 butene | = | 0.7% | do. |
| 1 pentene | = | 4.0% | do. |
| 2 pentene trans | = | 3.0% | do. |
| 2 methyl 1 butene | = | 8.3% | do. |
| 2 pentene cis | = | 1.7% | do. |
| 2 methyl 2 butene | = | 3.9% | do. |
| cyclopentane | = | 0.5% | do. |
| 1,4 pentadiene | = | 1.9% | do. |
| isoprene | = | 25.5% | do. |
| cyclopentene | = | 2.4% | do. |
| 1,3 pentadiene trans | = | 7.7% | do. |
| 2,3 pentadiene | = | 3.9% | do. |
| 2 butyn | = | 0.5% | do. |
| cyclopentadiene | = | 15.2% | do. |
| isopropenylacetylene | = | 0.2% | do. |

We worked under the following conditions:
Pressure at the column top: 1.2 kg/cm$^2$
Bottom temperature: 100°C
L/D = 2.5 (reflux ratio)
Plates = 70
Solvent: Formylmorpholine-water (5% by weight of water)
Solvent flow rate (Stream 7) = 100 kg/h From the top of column 3 we discharged:

| | | | |
|---|---|---|---|
| saturated and olefinic $C_4$ hydrocarbons | = | 0.2 | moles/h |
| isopentane | = | 8.6 | do. |
| n-pentane | = | 11.8 | do. |
| 3 methyl 1 butene | = | 0.7 | do. |
| 1 pentene | = | 4.0 | do. |
| 2 pentene trans | = | 3.0 | do. |
| 2 methyl 1 butene | = | 8.3 | do. |
| 2 pentene cis | = | 1.7 | do. |
| 2 methyl 2 butene | = | 3.7 | do. |
| cyclopentane | = | 0.5 | do. |
| 1,4 pentadiene | = | 1.5 | do. |
| isoprene | = | 0.3 | do. |

The stream leaving the bottom of column 3 was mixed to the stream leaving the top of stripper 25 and was then fed to column 12 wherein the side stream from the bottom portion of the column (line 20) was constituted by:

| | | | |
|---|---|---|---|
| saturated and olefinic $C_4$ hydrocarbons | = | 0.2 | moles/h |
| isopentane | = | 8.6 | do. |
| n-pentane | = | 11.8 | do. |
| 3 methyl 1 butene | = | 0.7 | do. |
| 1 pentene | = | 4.0 | do. |
| 2 pentene trans | = | 3.0 | do. |
| 2 methyl 1 butene | = | 8.3 | do. |
| 2 pentene cis | = | 1.7 | do. |
| 2 methyl 2 butene | = | 3.7 | do. |
| cyclopentane | = | 0.5 | do. |
| 1,4 pentadiene | = | 1.5 | do. |
| isoprene | = | 0.3 | do. |

The separation in column 12 was effected under the following conditions:
Pressure at the column top = 1.2 Kg/cm$^2$
Bottom temperature = 165°C
L/D = 1.5 (reflux ratio)
Plates: 65
Solvent: formylmorpholine-water (5% by weight of water)
Solvent flow rate: 20 Kg/h The stream leaving the top of column 12 was fed to column 14 which worked under the following conditions:
Pressure at column top: 1.2 Kg/cm$^2$
Bottom temperature = 100°C
L/D = 1 (reflux ratio)
Plates: 75

Solvent: Formylmorpholine-water (5% by weight of water)
Solvent flow rate: 8 Kg/H From the top a stream of raw isoprene free from cyclopentadiene and polar acetylenic compounds was discharged (said stream was sent to the final rectification):

| | | | |
|---|---|---|---|
| 2 methyl 2 butene | = | 0.2 | moles/h |
| 1,4 pentadiene | = | 0.4 | do. |
| isoprene | = | 24.61 | do. |
| cyclopentene | = | 2.29 | do. |
| 1,3 pentadiene trans | = | 4.66 | do. |
| 2,3 pentadiene | = | 1.73 | do. |

The stream from the bottom of column 14 was fed to the stripper 25 which worked under the following conditions:
pressure at the column top = 1.2 kg/cm$^2$
bottom temperature = 155°C
L/D = 0 (reflux ratio)
Plates = 25
The stream leaving the top of said column was recycled, as already described, to the column 12 for recovering the isoprene contained therein.

EXAMPLE 2

A stream of 100 moles/h of C$_5$ hydrocarbons was fed to the column 3; said stream had the following composition:

| | | | |
|---|---|---|---|
| isopentane | = | 7.6% | by moles |
| n-pentane | = | 10.5% | do. |
| 3 methyl 1 butene | = | 0.4% | do. |
| 1 pentene | = | 2.6% | do. |
| 2 methyl 1 butene | = | 4.8% | do. |
| 2 pentene cis | = | 3.2% | do. |
| 2 methyl 2 butene | = | 2.9% | do. |
| isoprene | = | 30.0% | do. |
| 1,3 pentadiene trans | = | 11.2% | do. |
| 2 butyn | = | 0.8% | do. |
| cyclopentadiene | = | 26.0% | do. |

We worked under the following conditions:
Pressure at the column top = 1.2 Kg/cm$^2$
Bottom temperature = 80°C
L/D = 3.5 (reflux ratio)
Plates = 80
Solvent = Formylmorpholine-morpholine-water (35/60/5 by weight)
Solvent flow rate = 40 Kg/h
From the top of column 3 we removed:

| | | | |
|---|---|---|---|
| isopentane | = | 7.6 | moles/h |
| n-pentane | = | 10.5 | do. |
| 3 methyl 1 butene | = | 0.4 | do. |
| 1 pentene | = | 2.6 | do. |
| 2 methyl 1 butene | = | 4.8 | do. |
| 2 pentene cis | = | 3.1 | do. |
| 2 methyl 2 butene | = | 2.7 | do. |
| isoprene | = | 0.3 | do. |

The stream leaving the bottom of column 3 was fed to column 12 whereto was fed also the stream from the top of stripper 25.
We worked under the following conditions:
Pressure at the column top = 1.2 Kg/cm$^2$
Bottom temperature = 165°C
L/D = 2.2 (reflux ratio)
Plates = 70
Solvent = Formylmorpholine-morpholine-water (ratio by weight 35/60/5)
Solvent flow rate: 15 Kg/h A side stream withdrawn from the second extractive distillation section was fed to the recovery of isoprene, after dimerization of cyclopentadiene and elimination of the acetylenic compounds by hydrogenation; said stream (line 20) was constituted by:

| | | | |
|---|---|---|---|
| isoprene | = | 3.0 | moles/h |
| 1,3 pentadiene trans | = | 8.3 | do. |
| 2 butyn | = | 0.8 | do. |
| cyclopentadiene | = | 26.0 | do. |

The stream leaving the top of column 12 was fed to column 14 which worked under the following conditions:
Pressure at the column top = 1.2 kg/cm$^2$
Bottom temperature = 85°C.
L/D = 1 (reflux ratio)
Plates = 50
Solvent = Formylmorpholine-morpholine-water (ratio by weight 35/60/5)
Solvent flow rate: 8 Kg/h From the top, a stream of raw isoprene free from cyclopentadiene and polar acetylenic compounds was discharged (said stream was fed to the final rectification):

| | | | |
|---|---|---|---|
| 2 pentene cis | = | 0.1 | moles/h |
| 2 methyl 2 butene | = | 0.2 | do. |
| isoprene | = | 26.7 | do. |
| 1,3 pentadiene trans | = | 2.9 | do. |

The stream from the bottom of 14 was fed to the stripping apparatus 25 working under the following conditions:
Pressure at the column top = 1.2 Kg/cm$^2$
Bottom temperature = 135°C
L/D = 0 (reflux ratio)
Plates = 25
The stream leaving the top of said column was recycled, as aforesaid, to the column 12 for recovering the isoprene contained therein.

What we claim is:
1. A process for the recovery of isoprene from mixtures of C$_5$ hydrocarbons containing isoprene, cyclopentadiene and acetylenic hydrocarbons which comprises:
   a. extractively distilling a C$_5$ hydrocarbon feed in a first extractive distillation column in the presence of a solvent for recovering isoprene said solvent being selected from the group consisting of N-formyl morpholine-water and N-formyl morpholine-morpholine-water; said solvent containing from 1–25% water, and withdrawing from the top of said first extractive distillation column the olefinic and saturated hydrocarbon in said C$_5$ hydrocarbon feed; and withdrawing the bottom product from said first extractive distillation column;
   b. passing said bottom product from said first extractive distillation column to a second extractive column and withdrawing from the top of said second extractive distillation column the overhead product; and withdrawing from the bottom said solvent which is divided and recycled to the upper portion of said first and second extractive distillation columns;

c. withdrawing a cyclopentadiene containing sidestream from said second extractive distillation column;

d. passing the overhead product obtained from said second extractive distillation column to a third extractive distillation column that is provided with a solvent for recovering isoprene said solvent being selected from the group consisting of N-formyl morpholine-water and N-formyl morpholine-morpholine-water said solvent containing from 1–25% of water; and obtaining from the bottom of said third extraction column a product which is stripped of said solvent for recovering isoprene, said solvent being recycled to the upper part of said third extraction column; and withdrawing the overhead product from said third extractive distillation column and recovering the isoprene therefrom in a final rectification.

2. Process for the recovery of isoprene from mixtures of $C_5$ hydrocarbons containing the same as claimed in claim 1 characterized in that in the first two extractive distillation columns solvents used are the same as the one used in the third extractive distillation column.

3. Process for the recovery of isoprene from mixtures of $C_5$ hydrocarbons containing the same as claimed in claim 1 characterized in that, the water content in the solvent used in the first two extractive distillation columns is different from the one in the solvent used in the third extractive distillation column.

4. A process as defined in claim 1 wherein the sidestream of step (c) is subjected to a thermal dimerization to form dicyclopentadiene from the cyclopentadiene and said dicyclopentadiene is thereafter stripped to recover isoprene which is recycled to the $C_5$ hydrocarbon feed.

* * * * *